United States Patent [19]

Johnson

[11] Patent Number: 5,588,084

[45] Date of Patent: Dec. 24, 1996

[54] SCINTILLATING OPTICAL FIBERS CONTAINING NON-UNIFORMLY DISTRIBUTED DOPANTS AND PROCESS FOR PREPARING SAME

[76] Inventor: Kurtis F. Johnson, 112 E. Sinclair Rd., Tallahassee, Fla.

[21] Appl. No.: 431,281

[22] Filed: Apr. 28, 1995

[51] Int. Cl.$^6$ .............................. G02B 6/02; F21V 9/16
[52] U.S. Cl. .................. 385/123; 385/124; 385/126; 385/141; 385/143; 385/145; 250/458.1; 250/459.1; 250/472.1; 250/473.1; 250/483.1
[58] Field of Search ................................ 385/123, 124, 385/126, 127, 141, 143, 145; 250/227.11, 227.14, 458.1, 459.1, 472.1, 473.1, 483.1, 484.2

[56] References Cited

U.S. PATENT DOCUMENTS

| | | | |
|---|---|---|---|
| 3,659,915 | 5/1972 | Maurer et al. | 385/123 X |
| 4,552,431 | 11/1985 | Allenmand et al. | 385/123 X |
| 4,788,436 | 11/1988 | Koechner | 250/485.1 |
| 4,812,647 | 3/1989 | Broussoux et al. | 362/32 X |
| 4,919,513 | 4/1990 | Nakakuki et al. | 385/127 X |
| 4,923,279 | 5/1990 | Ainslie et al. | 385/127 X |
| 4,940,901 | 7/1990 | Henry et al. | 250/370 |
| 4,948,668 | 8/1990 | Siol et al. | 385/124 X |
| 5,121,462 | 6/1992 | Fabre et al. | 385/143 |
| 5,249,251 | 9/1993 | Egalon et al. | 385/123 |
| 5,298,189 | 3/1994 | Kauffman | 252/301.17 |
| 5,424,546 | 6/1995 | Okada et al. | 250/486.1 |
| 5,425,122 | 6/1995 | Matsumura et al. | 385/124 |

OTHER PUBLICATIONS

S. R. Borenstein and R. C. Strand, Progress in the Development of Scintillating Optical Fibers, 1984, pp. 396–398.
R. Mountain et al., Monte Carlo Simulations of Scintillating Fiber Optic Waveguides, Oct. 1990, pp. 278–280.
P. Sonderegger, Fibre Calorimeters: Dense, Fast, Radiation Resistant, 1987, pp. 523–527.
D. W. Hertzog et al., Nuclear Instruments and Methods, A294, 1990.
K. F. Johnson et al., Nuclear Instruments and Methods, A317, 1992.
C. M. Hawkes et al., Nuclear Instruments and Methods, A292, 1990.

*Primary Examiner*—Brian Healy
*Attorney, Agent, or Firm*—Senniger, Powers, Leavitt & Roedel

[57] ABSTRACT

Scintillating fibers are provided comprising an outer layer, an inner layer, a fiber center and an interface between the inner and outer layers. The distance between the fiber center and any point of the interface in a fiber cross section defines a radius and the distance between the fiber center and any point located along the radius defines a fractional radius. The outer layer has an index of refraction lower than that of the inner layer. The inner layer contains a dopant non-uniformly distributed within the inner layer. Processes for the preparation of such scintillating fibers are also disclosed.

24 Claims, 2 Drawing Sheets

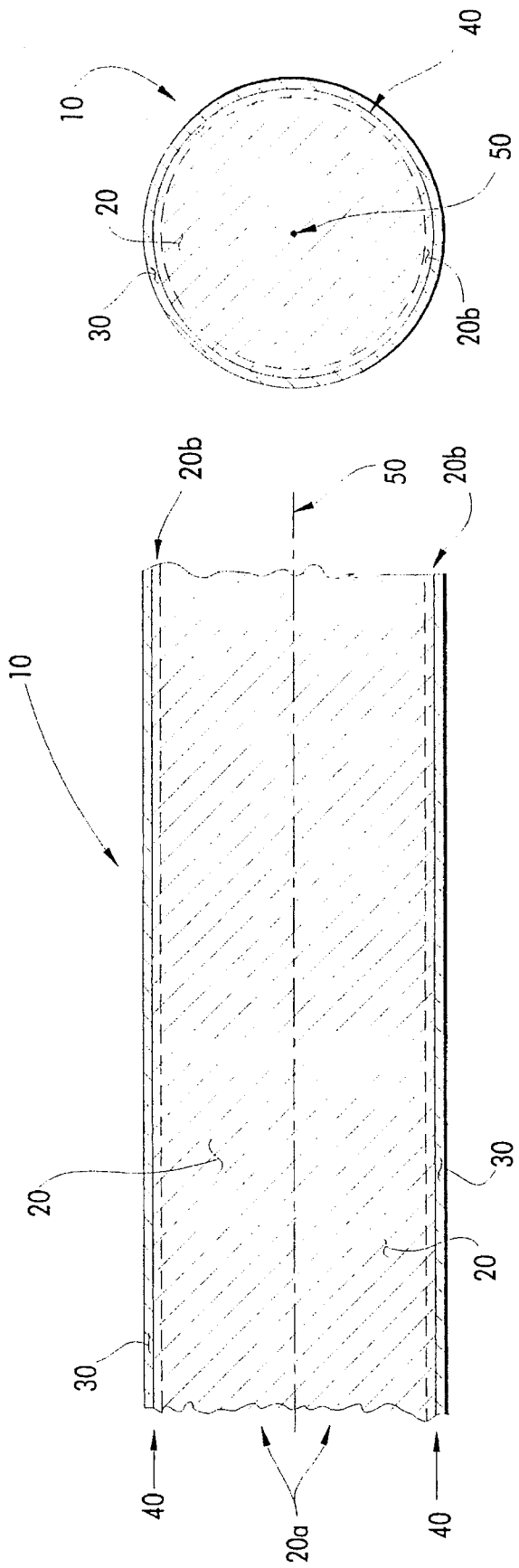

5,588,084

SCINTILLATING OPTICAL FIBERS CONTAINING NON-UNIFORMLY DISTRIBUTED DOPANTS AND PROCESS FOR PREPARING SAME

BACKGROUND OF THE INVENTION

This invention relates to scintillating and wavelength shifting fibers. More specifically, it relates to the non-uniform doping of such fibers with scintillation enhancing fluors and waveshifting dyes to maximize their light yield or to reduce the occurrence of timing tails. Scintillating and waveshifting fibers are finding increasing utility in physics and medical instrumentation. Scintillating fibers as they have been developed are comprised of scintillation enhancing fluors and waveshifting dyes uniformly dissolved into an inner layer (core material), which is then surrounded by an outer layer (cladding). The cladding serves to protect the core and enables the fiber to function as an "optical pipe." The specific composition of the core and cladding materials may vary. However, for the fiber to serve as an optical pipe, the cladding must have an index of refraction which is lower than that of the core so that the light rays are retained within the fiber's core and transported along its length by a process called "total internal reflection." In a scintillating fiber, light is generated near the track of an ionizing particle, propagates to the core/cladding interface and is either captured or lost at this boundary. A common problem associated with scintillating fibers used as optical pipes is the loss of a substantial portion of the transmitted light at the core/cladding interface. Another problem is the production of "timing tails," photons transported by the optical pipe which dribble into the photodetector long after the scintillation process is complete. Minimizing such tailing is desirable for high-rate conditions because tails can cause ambiguities in the perceived time of occurrence of a signal and in the measured strength of a signal.

SUMMARY OF THE INVENTION

Among the several objects of the invention, therefore, may be noted the provision of scintillating and waveshifting fibers which produce enhanced light yield or which produce an equivalent light yield using a reduced quantity of fluor; the provision of scintillating and waveshifting fibers which produce reduced levels of timing tails; and the provision of methods for making scintillating and waveshifting fibers which generate either enhanced light yield or reduced levels of timing tails.

Briefly, therefore, the present invention is directed to a novel scintillating fiber in which a dopant is non-uniformly distributed. The fiber includes an outer layer, an inner layer, a fiber center and an interface between the inner layer and the outer layer. The distance between the fiber center and the interface defines a radius and the distance between the fiber center and any point located along the radius defines a fractional radius. The outer layer has an index of refraction less than that of the inner layer and the inner layer contains a dopant non-uniformly distributed within the inner layer.

In another aspect of the invention, a fiber is provided containing a dopant in an optically active region of the fiber wherein, for any cross section of the fiber, the concentration by weight of the dopant for any volume of the fiber cross section representing at least $1 \times 10^{-4}$ of the total volume of the optically active region of the fiber cross section differs by more than 1% from the mean concentration by weight of the dopant for the total volume of the optically active region of the fiber cross section.

In yet another aspect of the invention, a fiber is provided containing a dopant in an optically active region of the fiber and the optically active region contains a core and a cladding. For any cross section of such fiber, the concentration by weight of the dopant for any volume of the cladding representing at least $1 \times 10^{-4}$ of the total volume of the optically active region of the fiber exceeds by more than 0.1% the concentration by weight of the dopant in the core of the fiber cross section.

The present invention is further directed to a novel process for the preparation of a scintillating fiber as defined above. The process includes the steps of selecting an inner layer material and an outer layer material so that the outer layer of the fiber has an index of refraction lower than the inner layer, incorporating a dopant into the inner layer so that the dopant is non-uniformly distributed within the inner layer, and affixing the outer layer to the inner layer, thereby forming the scintillating fiber.

Other objects and features will be in part apparent and in part pointed out hereinafter.

BRIEF DESCRIPTION OF THE DRAWINGS

FIG. 1 shows a schematic of a longitudinal section of a scintillating fiber in accordance with a preferred embodiment of the invention.

FIG. 2 shows a schematic of a cross section of a scintillating fiber in accordance with a preferred embodiment of the invention.

Corresponding reference characters indicate corresponding parts throughout the drawings.

DESCRIPTION OF THE PREFERRED EMBODIMENT

Figure 3:
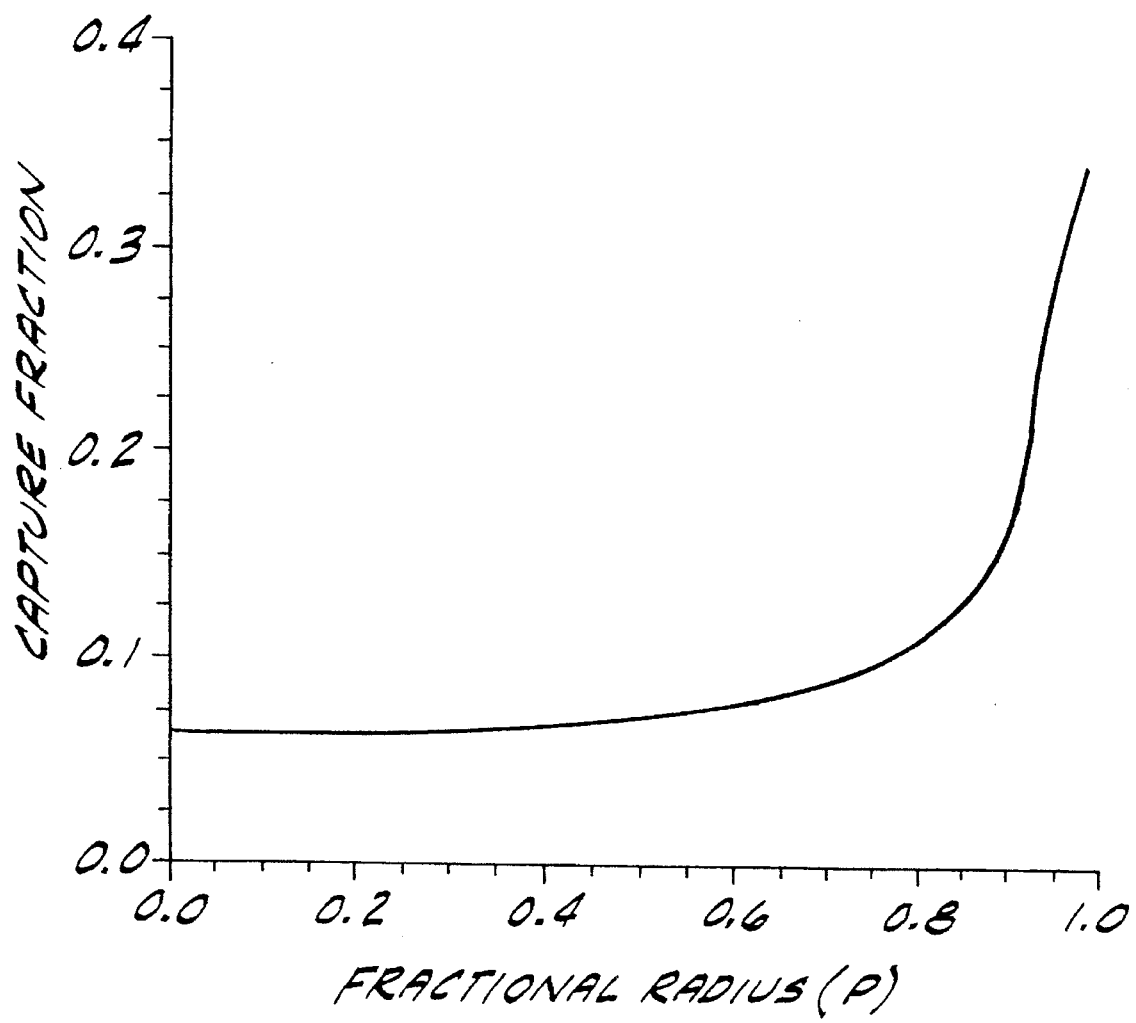
FIG. 3 is a graphic depiction of the dependence of capture fraction on the fractional radius of the point of photon emission for a scintillating fiber of the invention for an embodiment containing a polystyrene core/acrylic cladding.

As used herein, unless indicated otherwise, "scintillating fiber" generically encompasses fibers containing scintillation enhancing fluors or dyes and/or wavelength shifting (also called "waveshifting") fluors or dyes. "Dopant" means any compound known to serve as a scintillation enhancing or wavelength shifting fluor or dye. "Final dopant" or "final scintillating dopant" means the fluor or dye within the scintillating fiber which emits a photon at the longest wavelength. "Interface" is the area of intersection between the inner and outer layers of the scintillating fiber. The "fiber center" is the point at which the fiber's center of gravity (in cross section) is located. The "radius" is the distance between the fiber center and any point of the interface in the fiber cross section. The "fractional radius" is the distance between the fiber center and any point located along the radius. As used herein, the radius has a value of 1.0, and the fractional radius has a value between 0.0 and 1.0, determined by the ratio of the distance of the fractional radius to the distance of the radius. As defined herein, not all radii are necessarily equal, but will be in the typical case of a fiber of completely circular cross section. "Non-uniform" and "non-uniformly" distributed mean a distribution of a dopant is such that in the optically active region of any cross section of the fiber, the concentration by weight of the dopant for any volume of the fiber representing at least $1 \times 10^{-4}$ of the total volume of the optically active region of the fiber cross section differs by more than 1% from the mean concentration by weight of the dopant for the total volume of the optically active region of the fiber cross section. "Optically active region" means the region of a fiber in which particle energy is converted to light or in which the wavelength of light is shifted.

In accordance with the present invention, it has been discovered that the light-yield of scintillating fibers may be significantly increased or, alternatively, that the occurrence of timing tails may be substantially reduced by non-uniformly distributing the dopant of a scintillating fiber within the inner layer or core of the scintillating fiber in a predetermined manner. Such a construction results in the production of improved fibers for use in, for example, high-speed particle detectors and medical imaging devices.

In its broadest aspect, a scintillating fiber of the present invention contains a dopant in an optically active region of the fiber in which, for any cross section of such fiber, the concentration by weight of the dopant for any volume of the fiber cross section representing at least $1 \times 10^{-4}$ of the total volume of the optically active region of the fiber cross section differs by more than 1% from the mean concentration by weight of the dopant for the total volume of the optically active region of the fiber cross section. For certain embodiments, as described below, the optically active region of the scintillating fiber contains a core surrounded by a cladding. A dopant is contained within the cladding of the fiber and, for any cross section of such fiber, the concentration by weight of the dopant for any volume of the cladding representing at least $1 \times 10^{-4}$ of the total volume of the optically active region of the fiber exceeds by more than 0.1% the concentration by weight of the dopant in the core of the fiber cross section.

Referring now to FIGS. 1 and 2, there is shown a preferred embodiment of a scintillating fiber 10 having an inner layer 20 and an outer layer 30, an interface 40 between the layers and a fiber center 50. In certain embodiments of the invention, the inner layer 20 constitutes the "core" and the outer layer 30 the "cladding" of conventional waveguides. In other embodiments, however, the inner layer 20 is further divided into core 20a and inner cladding 20b regions, and the outer layer 30 constitutes an outer cladding.

The total light-yield of a scintillating fiber depends upon the percentage of light generated within the optically active region of the fiber which is either captured or lost at the interface of the fiber. An expression of the capture condition for a circular fiber in terms of the natural variables is set forth as follows:

$$\sin(\alpha)\sqrt{(1-\rho^2 \sin^2\phi)} < \sin \beta \quad (1)$$

where $\rho$=the fractional radius, $\phi$=azimuthal angle, $\alpha$=polar angle and $\beta$=critical angle. (Note: If $\alpha=90°$, $\sin \alpha=1$; if $\alpha=0°$, $\sin \alpha=0$.)

Since scintillation photons are emitted isotropically, the condition for capture of each individual photon can be converted to a "capture probability," also called a "capture fraction." Based on the expression of the capture condition (1), a photon emitted near the outside edge of the core, near $\rho=1$, has a higher probability of capture than when emitted at the center of the fiber. This higher probability is due to the generation of a heavier proportion of "spiral" modes of propagation in the area near the interface. By summing to find the solid angle which fulfills expression (1) and normalizing to $4\pi$, the capture probability is provided as a function of $\rho$.

If instead of generating the signal at a random position within the fiber, as done in conventional scintillating fibers, the signal from a dopant is produced predominantly (e.g., greater than about 60%) in a section of the inner layer wherein the fractional radius is from about 0.50 to about 1.0, preferably wherein from about 70% to 100% of the signal from the dopant is produced in a section of the inner layer wherein the fractional radius is from about 0.80 to 1.0, more preferably wherein from about 80% to 100% of the signal from the dopant is produced in a section of the inner layer wherein the fractional radius is from about 0.95 to 1.0, and most preferably, wherein about 100% of the signal from the dopant is produced in a section of the inner layer wherein $\rho>0.97$, the fraction of captured light is increased dramatically—up to almost three times the output of that generated by a randomly distributed signal. Thus, the light-yield of a scintillating fiber may be increased by the non-uniform distribution of the fluor, or the same light-yield may be obtained while realizing a significant savings in the quantity of fluor used in conventional scintillating fibers. Where more than a single dopant is present in the optically active region of the fiber, e.g., where the fiber contains both a primary scintillating fluor and a waveshifting fluor, the benefit of non-uniform distribution of dopants can generally be realized provided the final dopant is non-uniformly distributed. Thus, in the example just given, by concentrating the waveshifting fluor as the final dopant in the region near the interface, the primary emission will undergo its final waveshift and be re-emitted isotropically at this position where the capture probability is very high.

By way of illustration, the shifting of all final emission to $\rho>0.97$, where the capture probability is highest, may be accomplished by concentrating the final dopant at the rim of the inner layer of the scintillating fiber. In a scintillating fiber or waveguide, light is generated when an ionizing particle leaves a wake of excited molecules. A portion of the excitation energy is transferred to a primary fluor, usually present in high concentration, which typically fluoresces in the long ultraviolet (350 nm to 390 nm) spectrum. At these wavelengths the attenuation lengths for photons are only a few centimeters. To allow much greater attenuation lengths —e.g, in the meter range, the scintillator may be doped with a secondary, or waveshifting, fluor, at low concentration so that the primary light is shifted to a less attenuated wavelength, typically in the blue spectrum (420 nm to 450 nm). Some fibers have a second waveshifter to reach still longer wavelengths. Thus, to optimize light-yield, whichever fluor represents the final dopant for the scintillating fiber is concentrated in the outer portions, and preferably, at the rim of the core, i.e., at $\rho>0.97$ so that the primary emission will undergo its final waveshift and be re-emitted isotropically at the position in the fiber where the capture probability is highest.

Non-uniform distribution of dopants also improves light-yield for waveshifting fibers. Waveshifting fibers contain only the waveshifting dye, not the primary fluors of scintillating fibers. While in waveshifting fibers the "primary" light source is external, light-yield may still be optimized by concentrating the "final dopant," in this case the waveshifting dye, at or near the rim of the fiber's inner layer.

For precision timing applications in which it is desirable to keep timing tails to a minimum, the converse of the non-uniform doping scheme discussed above for enhancing light-yield is preferred. The "spiral" modes which produce enhanced light yield cover a longer path-length per unit of fiber length within the fiber than other modes and therefore loiter a longer time within the optical waveguide. Therefore, they increase the likelihood that timing tails will be produced. Accordingly, to minimize the generation of such "spiral" propagation modes, and thereby reduce the occurrence of timing tails, the signal from a dopant is produced predominantly (e.g., greater than about 60%) in a section of the inner layer wherein the fractional radius is from 0.00 to about 0.50, preferably wherein from about 70% to 100% of the signal from the dopant is produced in a section of the inner layer wherein the fractional radius is from 0.0 to about 0.4, more preferably wherein from about 80% to 100% of the signal from the dopant is produced in a section of the inner layer wherein the fractional radius is from 0.0 to about 0.3, and most preferably wherein about 100% of the signal from the dopant is produced in a section of the inner layer wherein $\rho<0.2$. Thus, the large p regions of the fiber are kept devoid of the dopant so that "spiral" modes are selected against and the timing tails are reduced to the minimum allowed by the scintillation process itself.

The benefits derived from non-uniform distribution of dopants in scintillating fibers disclosed herein are essentially independent of the material composition of the fiber. Accordingly, conventional combinations of core and cladding compositions and of the scintillating and waveshifting dopants used in such fibers which are well known to practitioners in this field may be utilized in making the scintillating fibers of the present invention. However, the specific combination of materials used should be coordinated so that the outer layer has a lower index of refraction than the inner layer and so that the materials are otherwise compatible.

In addition to acrylic, styrene and quartz, other compositions suitable for use as core and cladding materials in scintillating fibers are well known to those skilled in this art. Such compositions include a variety of transparent, glossy or polymeric compounds including fluorescent or scintillating inorganic crystals, polycarbonates, polyvinyltoluenes, polyvinylxylenes, fluorinated polymethylmethacrylates, and related materials, e.g., polytrifluoroethyl methacrylate, polyheptafluorobutylmethacrylate and the like. Scintillation enhancing or primary fluors include para-terphenyl, 2 (4-biphenyl) -5-4-tert-butylphenyl) -1,3,4-oxadiazole, 2,5-diphenyloxazole, and 2-(4-biphenyl- 1,3,4-oxadiazole, and waveshifting dyes include 3-hydroxyflavone, 2-(2'-hydroxyphenyl)-benzothiazole, 2, 2'-bipyridyl-3,3'-diol, 1-phenyl-3-mesityl-2-pyrazoline, para-bis [2-(5-phenyloxazolyl)]benzene, para-bis (ortho-methylstyryl) benzene, and 1,1,4,4-tetraphenylbutadiene.

The optimum concentration of scintillating fluors and waveshifting dyes incorporated into the scintillating fiber depends on such factors as the solubility limits of the materials used, the scintillating characteristics of the fluors, and the particular application for which the scintillating fiber is to be used. In general, however, the concentration of scintillating materials in conventional scintillating fibers typically will range between 0.01% and 5% for most applications. However, by using the non-uniformly doped fibers of the present invention, these concentrations are capable of being reduced to about one- third the levels of conventional fibers for the same light-yield production.

The specific diameter of the scintillating fibers of the present invention will vary depending upon the end use of the fiber. For most applications, the fiber cross section will have a diameter of from about 0.03 mm to about 2 mm, preferably from about 0.1 mm to about 1.5 mm. For use for X-ray imaging devices the diameter is most preferably in the range of 0.1 to 1 mm and for high-speed particle detectors the diameter is most preferably in the range of 0.2 mm to 1 mm.

In a preferred embodiment of the scintillating fibers of the present invention, a circular scintillating fiber having a 1 mm diameter cross section is produced containing a polystyrene core (n=1.59), an acrylic cladding (n=1.49), having 0.5% para-terphenyl, and 0.05% 3-hydroxyflavone (3-HF) dissolved within the core material. The 3-HF, as the final dopant, is completely concentrated at the rim of the core near the core/cladding interface (p>0.97). The critical angle for this combination of core/cladding materials is $\beta=20.5°$ from the tangent plane. The fraction of captured light for on-axis generated light is 0.065; for light generated at the interface (p=0.99), the fraction is 0.34. The dependence of the capture fraction on p for the combination of a polystyrene core/acrylic cladding is shown in FIG. 3. As shown in FIG. 3, the capture fraction is virtually constant, rising from 0.06 at p=0, to only 0.1 at p=0.8, and then steepens, doing so dramatically at about p=0.95. Assuming uniform light generation throughout the fiber cross section, the average capture fraction would be 0.12. However, since in the preferred embodiment discussed above, the signal is generated by a final dopant concentrated near the core/cladding interface (p>0.97), the fraction of captured light rises from 0.12 to 0.34, nearly three times as large as produced by conventional scintillating fibers in which the final dopant is uniformly distributed.

The present invention is further directed to a process for the preparation of scintillating fibers as described above wherein the final dopant is non-uniformly distributed within the fiber. The fibers of the present invention are prepared by conventional means, except that certain steps, described below, are employed to achieve the non-uniform distribution of the final dopant. For instance, conventional scintillating fibers may be produced by a process including the steps of dissolving scintillating fluors and/or waveshifting dyes into a core material (inner layer), polymerizing the core material to create a preform bar of the core material, coating the preform bar with a cladding material (outer layer) to affix the cladding material to the core, and drawing the cladding-coated preform until a scintillating fiber having a preselected diameter is formed.

The scintillating fibers of the present invention are prepared using a modification of the above scheme to provide the non-uniform distribution of the final dopant within the inner layer. In one alternative, an inner cladding is prepared. This inner cladding is then inserted between the core and the outer cladding by some suitable means such as by coating the core with the inner cladding material prior to affixing the outer cladding coating.

In this alternative, to create a non-uniform distribution of a dopant, particularly the final dopant, within the scintillating fiber which favors enhanced light-yield, a greater proportion of the dopant may be dissolved within the inner cladding than in the core prior to application of the inner cladding to the core. The inner cladding thus constitutes the outer portion or rim area of the inner layer abutting the interface, i.e., the portion having a fractional radius of, e.g., 0.5–1.0, or p >0.97. If a distribution favoring reduced timing tails is desired, a greater proportion of the dopant is dissolved within the core material than in the inner cladding to achieve, e.g., a concentration of greater than 60% at, e.g., 0.0–0.5.

Non-uniform doping may also be obtained by dissolving a dopant into a solvent and dipping the preform bar of core material into the solvent and allowing the solvent to carry the fluor into the interior of the preform in a time-dependent manner so that the desired fluor distribution profile is achieved.

In view of the above, it will be seen that the several objects of the invention are achieved and other advantageous results attained.

As various changes could be made in the above compositions and processes without departing from the scope of the invention, it is intended that all matter contained in the above description and shown in the accompanying drawings shall be interpreted as illustrative and not in a limiting sense.

What is claimed is:

1. A scintillating fiber comprising an outer layer, an inner layer, a fiber center and an interface between the inner and outer layers, wherein the distance between the fiber center and any point of the interface in a fiber cross section defines a radius and the distance between the fiber center and any point located along the radius defines a fractional radius, and wherein the outer layer has an index of refraction lower than that of the inner layer and wherein the inner layer contains a dopant non-uniformly distributed within the inner layer.

2. A scintillating fiber as set forth in claim 1 wherein from about 60% to 100% of the dopant is contained in a section of the inner layer wherein the fractional radius is from about 0.50 to 1.0.

3. A scintillating fiber as set forth in claim 1 wherein from about 70% to 100% of the dopant is contained in a section of the inner layer wherein the fractional radius is from about 0.80 to 1.0.

4. A scintillating fiber as set forth in claim 3 wherein from about 80% to 100% of the dopant is contained in a section of the inner layer wherein the fractional radius is from about 0.95 to 1.0.

5. A scintillating fiber as set forth in claim 4 wherein about 100% of the dopant is contained in a section of the inner layer wherein the fractional radius is from about 0.97 to 1.0.

6. A scintillating fiber as set forth in claim 1 wherein the inner layer comprises polystyrene and the outer layer comprises acrylic.

7. A scintillating fiber as set forth in claim 1 wherein the dopant comprises a wave-shifting dye and the inner layer further comprises at least one scintillation enhancing fluor.

8. A scintillating fiber as set forth in claim 1 wherein the inner layer comprises a core and an inner cladding located between the core and the interface, wherein from about 60% to 100% of the dopant is contained within the inner cladding.

9. A scintillating fiber as set forth in claim 8 wherein about 100% of the dopant is contained within the inner cladding.

10. A scintillating fiber as set forth in claim 2 wherein the inner layer comprises polystyrene and the outer layer comprises acrylic.

11. A scintillating fiber as set forth in claim 2 wherein the dopant is a final dopant.

12. A scintillating fiber as set forth in claim 1 wherein from about 60% to 100% of the dopant is contained in a section of the inner layer wherein the fractional radius is from 0.00 to about 0.50.

13. A scintillating fiber as set forth in claim 12 wherein from about 70% to 100% of the dopant is contained in a section of the inner layer wherein the fractional radius is from 0.00 to about 0.4.

14. A scintillating fiber as set forth in claim 13 wherein from about 80% to 100% of the dopant is contained in a section of the inner layer wherein the fractional radius is from 0.00 to about 0.3.

15. A scintillating fiber as set forth in claim 14 wherein about 100% of the dopant is contained in a section of the inner layer wherein the fractional radius is from 0.00 to about 0.20.

16. A scintillating fiber as set forth in claim 12 wherein the inner layer comprises polystyrene and the outer layer comprises acrylic.

17. A scintillating fiber as set forth in claim 12 wherein the dopant comprises a final dopant.

18. A scintillating fiber as set forth in claim 1 wherein the inner layer comprises a core and an inner cladding located between the core and the interface, wherein from about 60% to 100% of the dopant is contained within the core.

19. A scintillating fiber as set forth in claim 18 wherein about 100% of the dopant is contained within the core.

20. A process for the preparation of the scintillating fiber of claim 1 comprising the steps of selecting an inner layer material and an outer layer material so that the outer layer of the fiber has a lower index of refraction than the inner layer, incorporating the dopant into the inner layer so that the dopant is non-uniformly distributed within the inner layer, and affixing the outer layer to the inner layer, thereby forming the scintillating fiber.

21. A process as set forth in claim 20 wherein the dopant is non-uniformly distributed within the inner layer by preparing an inner layer comprising a core and an inner cladding sheathing the core, and incorporating from about 60% to 100% of the final dopant into either the core or the inner cladding.

22. A process as set forth in claim 20 wherein the dopant is non-uniformly distributed within the inner layer by dissolving the dopant in a solvent and allowing the solvent to carry the dopant into the inner layer for a predetermined time interval so that the dopant is non-uniformly distributed within the inner layer.

23. A fiber containing a dopant in an optically active region of the fiber wherein, for any cross section of the fiber, the concentration by weight of the dopant for any volume of the fiber cross section representing at least $1 \times 10^{-4}$ of the total volume of the optically active region of the fiber cross section differs by more than 1% from the mean concentration by weight of the dopant for the total volume of the optically active region of the fiber cross section.

24. A scintillating fiber containing a dopant in an optically active region of the fiber wherein the optically active region includes a core and a cladding and wherein, for any cross section of the fiber, the concentration by weight of the dopant for any volume of the cladding representing at least $1 \times 10^{-4}$ of the total volume of the optically active region of the fiber exceeds by more than 0.1% the concentration by weight of the dopant in the core of the fiber cross section.

* * * * *